US012571237B2

(12) United States Patent
Szegeny et al.

(10) Patent No.: US 12,571,237 B2
(45) Date of Patent: Mar. 10, 2026

(54) ELECTROMOTIVE DRIVE FOR MOTOR VEHICLE APPLICATIONS

(71) Applicant: KIEKERT AKTIENGESELLSCHAFT, Heiligenhaus (DE)

(72) Inventors: Peter Szegeny, Engelskirchen (DE); Ömer Inan, Dorsten (DE); Michael Scholz, Essen (DE); Holger Schiffer, Meerbusch (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 40 days.

(21) Appl. No.: 18/549,685

(22) PCT Filed: Mar. 7, 2022

(86) PCT No.: PCT/DE2022/100176
§ 371 (c)(1),
(2) Date: Sep. 8, 2023

(87) PCT Pub. No.: WO2022/194327
PCT Pub. Date: Sep. 22, 2022

(65) Prior Publication Data

US 2024/0151072 A1 May 9, 2024

(30) Foreign Application Priority Data

Mar. 15, 2021 (DE) ..................... 10 2021 106 210.1

(51) Int. Cl.
*E05B 81/06* (2014.01)
*E05B 15/04* (2006.01)
(Continued)

(52) U.S. Cl.
CPC .............. *E05B 81/06* (2013.01); *E05B 15/04* (2013.01); *E05B 81/14* (2013.01); *E05B 81/30* (2013.01);
(Continued)

(58) Field of Classification Search
CPC ....... E05B 2015/0496; E05B 2015/042; E05B 81/06; E05B 81/14; E05B 81/30;
(Continued)

(56) References Cited

U.S. PATENT DOCUMENTS 5,934,717 A * 8/1999 Wirths .................... E05B 81/14 292/216
6,155,124 A * 12/2000 Wirths .................... E05B 81/25 292/201
(Continued)

FOREIGN PATENT DOCUMENTS

DE 19754216 A1 * 3/1999 ............. E05B 81/14
DE 19913666 A1 * 9/2000 ............. E05B 77/42
(Continued)

OTHER PUBLICATIONS

International Search Report mailed Jul. 4, 2022, for priority International Application No. PCT/DE2022/100176.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

An electromotive drive for motor vehicle applications, in particular for applications for and in a motor vehicle lock. For this purpose, the drive is equipped with an electric motor, a drive disk which can be actuated by the electric motor and can be rotated about an axis, and at least one
(Continued)

spring assigned to the drive. The spring transmits a force to the drive disk which aids the drive within the scope of the invention.

17 Claims, 7 Drawing Sheets

(51) Int. Cl.

| | |
|---|---|
| ***E05B 81/14*** | (2014.01) |
| ***E05B 81/30*** | (2014.01) |
| ***E05B 81/34*** | (2014.01) |
| ***E05B 81/42*** | (2014.01) |
| ***E05B 81/56*** | (2014.01) |

(52) U.S. Cl.
CPC .............. *E05B 81/34* (2013.01); *E05B 81/42* (2013.01); *E05B 81/56* (2013.01); *E05B 2015/042* (2013.01)

(58) Field of Classification Search
CPC .......... E05B 81/34; E05B 81/42; E05B 81/56; E05B 81/50; E05B 15/04
USPC .......................................................... 70/278.7
See application file for complete search history.

(56) References Cited

U.S. PATENT DOCUMENTS

| | | | | |
|---|---|---|---|---|
| 6,773,042 | B2 * | 8/2004 | Spurr | E05B 81/14 292/201 |
| 6,786,530 | B2 * | 9/2004 | Fisher | E05B 81/14 70/264 |
| 7,163,239 | B2 * | 1/2007 | Fisher | E05B 81/14 292/201 |
| 11,466,486 | B2 * | 10/2022 | Inan | E05B 81/14 |
| 2004/0055407 | A1 | 3/2004 | Coleman et al. | |
| 2018/0258671 | A1 * | 9/2018 | Graute | E05B 81/50 |
| 2018/0340359 | A1 * | 11/2018 | Cumbo | E05B 81/42 |
| 2019/0063117 | A1 * | 2/2019 | Mozola | E05B 81/14 |
| 2022/0145675 | A1 * | 5/2022 | Okawa | E05B 81/42 |

FOREIGN PATENT DOCUMENTS

| | | | | |
|---|---|---|---|---|
| DE | 10218628 | A1 * | 11/2003 | E05B 81/14 |
| DE | 10258391 | A1 | 6/2004 | |
| DE | 202012001961 | U1 * | 7/2013 | E05B 47/0012 |
| DE | 202012012799 | U1 | 12/2013 | |
| DE | 102015205345 | A1 | 9/2016 | |
| DE | 102018120697 | A1 | 2/2019 | |
| DE | 102018109477 | A1 | 10/2019 | |
| EP | 0198509 | A1 * | 10/1966 | E05B 81/25 |

* cited by examiner

ELECTROMOTIVE DRIVE FOR MOTOR VEHICLE APPLICATIONS

This application is a national phase of International Patent Application No. PCT/DE2022/100176 filed Mar. 7, 2022, which claims priority to Germ Patent Application No. 10 2021 106 210.1 filed Mar. 15, 2021, each of which is hereby incorporated herein by reference in its entirety.

FIELD OF DISCLOSURE

The invention relates to an electromotive drive for motor vehicle applications, in particular applications for and in a motor vehicle lock, having an electric motor, and further comprising a drive disk which can be actuated by the electric motor and can be rotated about an axis, and having at least one spring assigned to the drive. The drive is preferably an opening drive for the motor vehicle lock in question.

BACKGROUND OF DISCLOSURE

Electromotive drives for motor vehicle applications are typically operated with a low DC voltage of, for example, 12 V, 24 V or even 48 V. For this reason, the drive power levels are limited which can be produced by means of the electric motor in order to control functional units for example via the electromotive drive. These functional units can, in general, be a window pane, if the electromotive drive is designed as a window lift drive. Other applications and designs are of course also conceivable. The electromotive drive can thus serve to adjust a seat, a mirror, etc.

Most particularly preferably, such electromotive drives are used for and in motor vehicle locks. In this case, functional units such as individual levers are moved by means of the drive disk. In this way, different functional positions such as “locked”, “theft-proof” or “child-proof” can be selected. Furthermore, such electromotive drives are advantageously used as opening drives in the interior of motor vehicle locks. In such a case, the electromotive drive or opening drive operates indirectly or directly on a pawl as a component of a locking mechanism consisting of catch and pawl, and ensures that the pawl is lifted from its engagement with the catch.

This can take place directly in that the drive disk acts directly on the pawl and lifts it from its engagement with the catch. Generally, however, an indirect intervention is observed, namely such that the drive disk operates on the pawl in the opening direction via an interposed release lever. For the latter applications, sometimes high torques are required in order to match and overcome a door sealing pressure that is present during the opening process and must be overcome. For this reason, a rotational movement of an output shaft of the fast-running electric motor is generally converted by a ratio of one or more. The drive disk also contributes to the conversion.

Such an electromotive drive is described and presented by way of example and not in a limiting manner in the utility model DE 20 2012 001 961 U1. In normal operation, the electric drive acts on the locking mechanism consisting of catch and pawl to produce an electrical opening. In addition, a mechanical opening of the locking mechanism is also provided, at least during emergency operation. For this purpose, the drive disk is equipped with a return spring assigned thereto. The return spring ensures that the electric drive returns to a neutral position after the application of a release lever. For this purpose, the spring is a center-zero spring.

In other and similarly designed electromotive drives, as described and presented in DE 20 2012 012 799 U1, a first return spring, a second return spring and additionally a third return spring are realized in a comparable manner. In this case too, after an excursion or travel of the electromotive drive, the return springs ensure that the latter is returned to its initial position or neutral position.

The same applies to the electromechanical actuating device according to EP 0 198 509 A1. In this case too, a drive wheel comprises a torque spring which returns a gear wheel driven by the electric motor and the drive wheel to a specific angular position.

In principle, the prior art has proven successful when it is necessary to act on individual functional units by means of the electromotive drive, and to provide the associated spring for returning it into a neutral position or initial position. In the case of an opening drive, the functional unit is a release lever which works on the pawl of a locking mechanism or on the pawl itself. However, in practice, there are situations in which the forces to be overcome, for example during electrical opening, are too strong at the start of the process, such that the electromotive drive is over-stressed, or an expansive and expensive transmission is required for a corresponding torque transmission. In other cases, such increasing forces can be caused by aging-related changes in the closing force—for example, associated with a hardening of rubber seals, increasing friction, etc. The invention aims to provide a remedy for this.

SUMMARY OF DISCLOSURE

The invention is based on the technical problem of further developing such an electromotive drive for motor vehicle applications in such a way that forces that are present as a result of the design or of aging can be overcome in a structurally simple manner when the functional element or functional unit is actuated.

To solve this technical problem, the invention proposes, in the case of a generic electromotive drive, that the spring transmits a force to the drive disk which aids the drive. For this purpose, the spring is advantageously designed as a leg spring. In addition, the design is usually such that the leg spring in question is fixedly connected by its wound portion to, for example, a pin. In addition, the leg spring interacts with its one drive leg with a contour on the drive disk. In contrast, the other leg or fixed leg of the leg spring rests against a stop.

In this way, to help the drive, the drive leg, in contact with the contour of the drive disk, can spread out further relative to the fixed leg. According to the invention, such a spreading of the drive leg relative to the fixed leg is observed and used when the drive disk acts indirectly or directly on a functional element or a functional unit. If the electromotive drive for motor vehicle applications is an electromotive opening drive for a motor vehicle lock, the opening process corresponds to the drive disk operating indirectly or directly on a pawl of a locking mechanism of the motor vehicle lock. By means of the drive disk, the pawl is lifted from its latching engagement with the catch in the closed position of the locking mechanism of the motor vehicle lock and can, as a result, pivot open the (spring-assisted) catch, and release a previously captured locking bolt.

In any case, this opening process of the electromotive drive is aided according to the invention by the force of the previously tensioned leg spring. This is because the said opening process and/or the indirect or direct loading of the pawl as the functional element or functional unit generally corresponds to a specific rotational movement of the drive disk (clockwise or counterclockwise). This movement of the drive disk for opening the locking mechanism is then mechanically aided according to the invention by the leg spring being tensioned in a initial position or neutral position and yielding its stored spring energy to the drive disk during the opening process—and in this way aiding the electromotive actuating movement additionally with spring energy. In fact, in this process, the drive leg resting against the contour of the drive disk spreads increasingly in relation to the stationary fixed leg.

In this way, by means of the electromotive drive—and in the example of an opening drive for a motor vehicle lock—any door sealing pressure can advantageously be overcome, specifically in a structurally simple manner and with a particularly cost-effective design. In this case, the approach according to the invention is suitable not only for overcoming high door sealing loads, but can be used quite generally to aid the electromotive drive when it is actuating functional elements or functional units. This is because the spring energy or tension energy additionally delivered via the spring makes it possible for example to design the electric motor with lower output rating than was previously possible. Likewise, elaborate and interposed gearings between the electric motor and the drive disk or the actuated functional element or the functional unit can be dispensed with. As a result, the design and cost outlay is reduced further.

The spring provided at this point is, as stated, already tensioned in the initial starting and/or initial position or neutral position of the drive disk, such that in the described opening process the tension energy or spring energy released in this way can advantageously be used to mechanically support the rotational movement of the drive disk. In order to bring about the tensioning of the spring in the neutral position and/or initial position, the spring is tensioned (again) during each return of the electromotive drive proceeding from its extended position into the initial position or neutral position. This is possible without any problems because, during the said return, it is not usually necessary to overcome any door sealing forces or door closing forces. Instead, a closing operation of an associated motor vehicle door is carried out either manually by a user or takes place independently of the described opening drive in the example by means of an additionally provided closing drive.

In any case, a mechanical force accumulator is available as the at least one spring functionally assigned to the drive, which, starting from the initial position or neutral position of the electromotive drive, supports the energy provided by the electromotive drive by means of the released tension energy or spring energy when the functional element or functional unit is actuated. Such a design can be realized and implemented in a particularly simple manner in terms of the construction, such that significant advantages are thereby observed.

In fact, the design is selected in such a way that the drive disk is designed to be circular, with the axis for its rotational movements as a center point. In contrast, the already mentioned contour for the contact of the drive leg of the leg spring is concentric in relation to the axis, as well as arcuate—i.e., when viewed over a specific and limited angle.

In addition, the drive leg is advantageously equipped with an extension arm. The extension arm can interact with an additionally provided cam on the drive disk for positioning the drive disk. In this case, the cam is generally realized in addition to the contour on the drive disk. The cam can then interact with, for example, a convexity or recess in the extension arm of the drive leg. As soon as the cam dips into the convexity or recess in question on the extension arm of the drive leg, the drive disk is thereby temporarily fixed in the desired position. As a result, for example, an end position of the drive disk, or also the previously mentioned neutral position or initial position of the drive disk, can be predetermined mechanically. The convexity or recess on the extension arm functions in this context as a latching contour that overlaps the cam. Consequently, the cam engages in the latching contour as soon as the drive disk assumes the predetermined position and, for example, the end position and/or the initial position or the neutral position.

The cam in question and the contour are generally integrally formed on the drive disk. Such an embodiment is particularly recommended if the drive disk is made of plastic. Of course, embodiments made of metal, for example aluminum, steel or brass, are also conceivable. In addition, the design is often selected such that both the contour and the cam are generally arranged on an underside of the drive disk. In contrast, the opposite upper side of the drive disk is equipped, for example, with an actuating contour, by means of which the drive disk operates indirectly or directly on the pawl for opening the locking mechanism made of a catch and pawl in the example of the opening drive. As a result of this design, the actuating contour for actuating the functional element or the functional unit on the one hand and the contour interacting with the spring as well as the cam on the other hand can be designed independently of one another. In addition, the contours in question can be realized in a particularly simple and cost-effective manner, namely in that they are advantageously molded onto the drive disk.

According to a further advantageous embodiment, an electrical current applied to the motor can be detected as a function of the (assisting) force built up by the spring. That is to say, in this case a control unit is generally provided, by means of which the electromotive drive is actuated on the one hand, and which, on the other hand, evaluates the electric current to be applied to the motor. For this purpose, a sensor additionally provided in an electrical supply line of the electric motor can be evaluated by means of the control unit for detecting the current consumed by the electric motor.

As a rule, however, the control unit ensures that the electric motor is actuated directly, such that the consumed current used to actuate the electric motor can be detected by said control unit. In this way, practically any desired position for a possible intermediate stop of the drive disk can be realized and implemented. This is because, depending on the tensioning of the spring by the drive disk, the spring either ensures a mechanical support of the rotational movement of the drive disk, and consequently a reduced current consumption, or an increased current consumption applied the electric motor is observed in the opposite direction and during tensioning of the spring.

These different values for the current consumption of the electric motor can then be associated with different positions or rotational positions of the drive disk. In addition, a corresponding calibration is conceivable, in which each value of the current consumption is associated with a certain angle of the rotational movement of the drive disk. As a result, the associated (rotational angle) position of the drive disk can ultimately be deduced from the current consumption measured by the control unit for the electric motor. This specific indication of the position can then be used according to the invention to the effect that the control unit controls the drive disk as a function of the current received by the electric motor and possibly a force of the spring. As a result, in principle any number of positions of the drive disk can be specified via the current consumption of the electric motor. As soon as a corresponding current value for the current consumption of the electric motor has been detected by the control unit, which corresponds to a desired position of the drive disk, the control unit ensures, for example, that the electric motor is switched off and consequently the drive disk assumes and maintains the predetermined position. In this case, a possible lag of the drive disk due to mass inertias can also be taken into account.

As a result, the drive disk can be transferred into the basic positions, namely the base position and/or the initial position and the neutral position and the end position, wherein one or both positions can be advantageously mechanically secured, namely by the interaction between the latching contour in the extension arm of the drive leg and the cam on the drive disk. However, according to the invention, practically any intermediate position of the drive disk can be selected reproducibly via the relationship between the consumed current and the angular position of the drive disk. This is particularly important and advantageous for the case in which the electromotive drive is to be used, for example, in the interior of a motor vehicle lock, and can represent different functional positions with its aid, such as, for example, “theft-proof”, “child-proof” or “locked” etc. As a result, the associated actuating contours, which are required in each case and usually separately, can be brought into engagement with associated levers in each case.

As a result, an electromotive drive which is structurally particularly simple and cost-effective is provided for motor vehicle applications. This is because the electromotive drive uses a spring which is tensioned in its initial position such that when a functional element or a functional unit is actuated, starting from the initial position, the spring additionally outputs its stored spring energy and thus aids the drive movement of the drive disk. In addition, a correlation between the current consumed by the electric motor and the associated (angular) position of the drive disk can be used to effect and realize an intermediate stop at practically any position of the drive disk. Herein lie the essential advantages.

BRIEF DESCRIPTION OF DRAWINGS

The invention is explained in greater detail below with reference to a drawing which shows only one exemplary embodiment. In the drawing.

DETAILED DESCRIPTION

Figure 1:
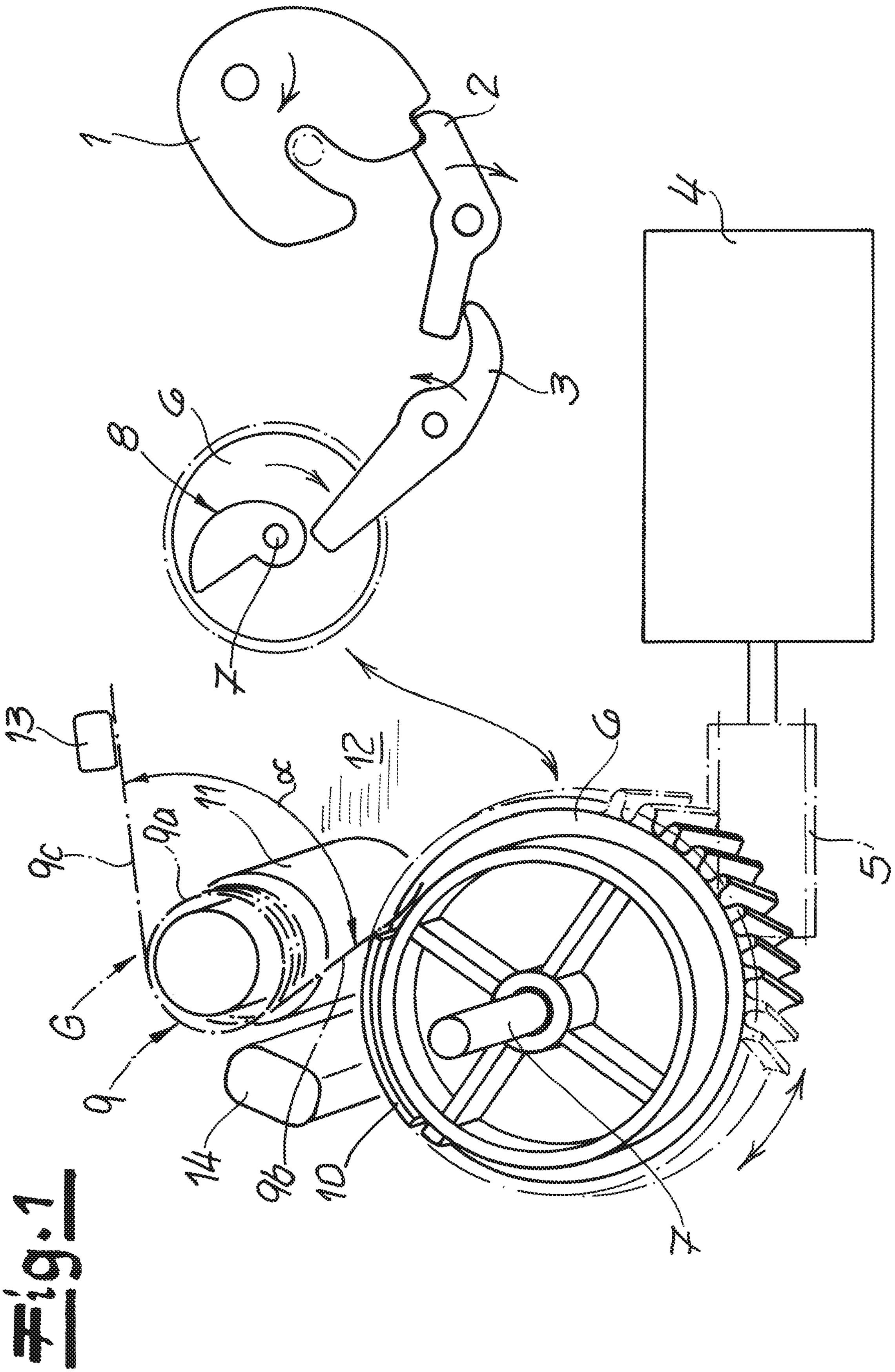
FIGS. 1 and 2 show the electromotive drive according to the invention during an opening process.

The figures show an illustration of an electromotive drive unit for automotive applications. In the exemplary embodiment, the electromotive drive is an opening drive for a motor vehicle lock, which is shown and reproduced with its essential components in FIG. 1. In fact, a locking mechanism 1, 2 of the motor vehicle lock in question, which is or can be a motor vehicle door lock, can be seen at this point and in the front view. The locking mechanism 1, 2 is composed of a catch 1 and a pawl 2.

In addition, a release lever 3 is also realized, by means of which the pawl 2 can be lifted from its latching engagement with the catch 1 (in the illustrated closed position of the locking mechanism 1, 2). For this purpose, the release lever 3 performs a clockwise movement about its axis, such that the pawl 2 is thereby lifted counterclockwise from its latching engagement with the catch 1 in the closed position of the locking mechanism 1, 2 shown in FIG. 1. As a result, the catch 1 opens in a spring-assisted manner, namely in the clockwise direction, and releases a previously captive locking bolt, indicated in the drawing. As a result, an associated motor vehicle door can be opened directly.

The electromotive drive is provided and designed to open the locking mechanism 1, 2 and/or to actuate the release lever 3 as a functional element or functional unit. The electromotive drive comprises an electric motor 4. The electric motor 4 has on its output shaft an output worm 5 which interacts with a drive disk 6 by virtue of the output worm 5 engaging in a toothing of the drive worm 6 and causing said drive worm to rotate about an axis 7 in the clockwise direction and in the counterclockwise direction, as shown by a double-headed arrow in FIG. 1.

An actuating contour 8 is provided on an upper side of the drive disk 6 and is designed to pivot the release lever 3 in the counterclockwise direction about its axis in order to open the locking mechanism 1, 2. This corresponds to a clockwise movement of the drive disk 6 in the front view or when looking at the upper side of the drive disk 6.

In contrast, the opposite underside of the drive disk 6, which is likewise shown in FIG. 1, is equipped with a spring 9 assigned to the electromotive drive on the one hand and a contour 10 on the other hand on the drive disk 6. The opening movement of the drive disk 6 in the clockwise direction in relation to the upper side of the drive disk 6 consequently corresponds to the drive disk 6 performing a counterclockwise movement about its axis 7 when viewed from the underside of the drive disk 6. In fact, the spring 9 is designed such that it transmits a force supporting the drive to the drive disk 6.

According to the exemplary embodiment, the spring 9 is designed as a leg spring. For this purpose, the spring 9 has a wound portion 9*a* which is connected in a stationary manner to a pin 11. According to the embodiment and not in a limiting manner, the pin 11 is connected to a motor vehicle lock housing 12.

In addition to the wound portion 9*a*, the leg spring 9 has two legs 9*b*, 9*c*. The leg 9*b* is a drive leg 9*b* which interacts with the previously explained contour 10 on the drive disk 6 (on the underside thereof). In contrast, the other leg 9*c* is formed as a fixed leg 9*c* of the leg spring 9 and rests against a stop 13. Like the pin 11, the stop 13 is (in one piece) connected to the lock housing 12 (made of plastic).

The drive leg 9*b* of the spring and/or leg spring 9 ensures the assistance to the electromotive drive or the assistance to the drive disk 6 during an opening process. This opening process of the drive disk 6 corresponds to a movement of the drive disk 6 in the counterclockwise direction in relation to the axis 7, and in the bottom view or the view of the underside of the drive disk 6, as can be understood by observing FIGS. 1 and 2 in sequence.

Figure 2:
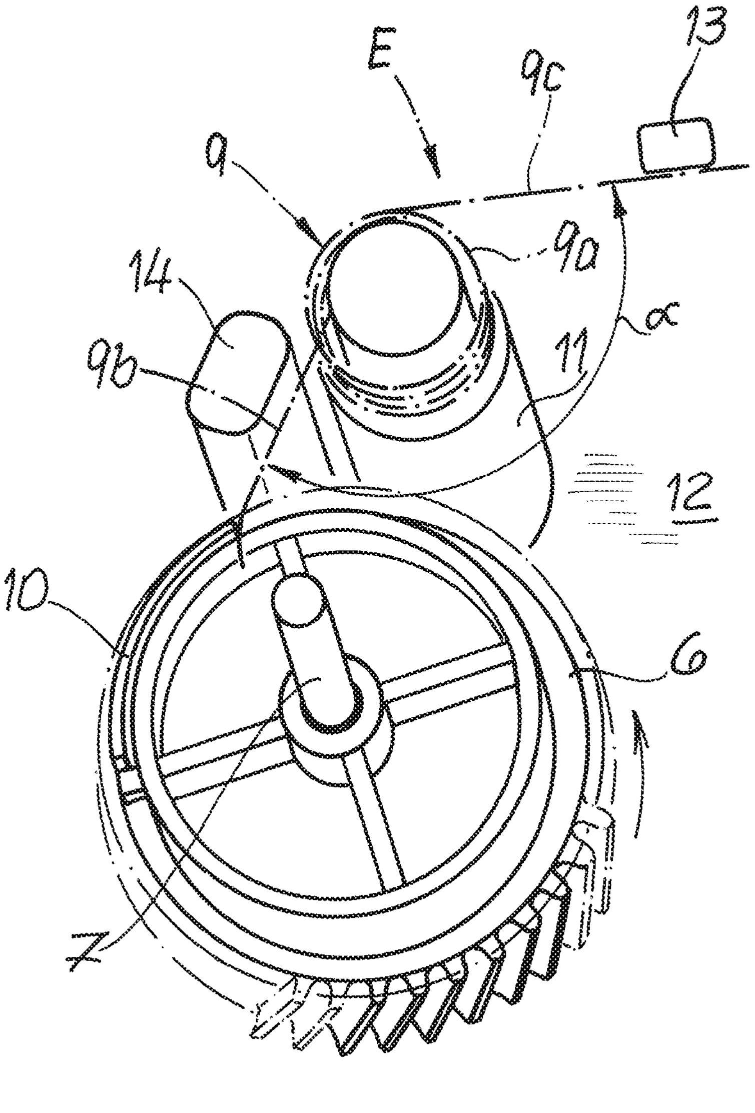
Figure 3:
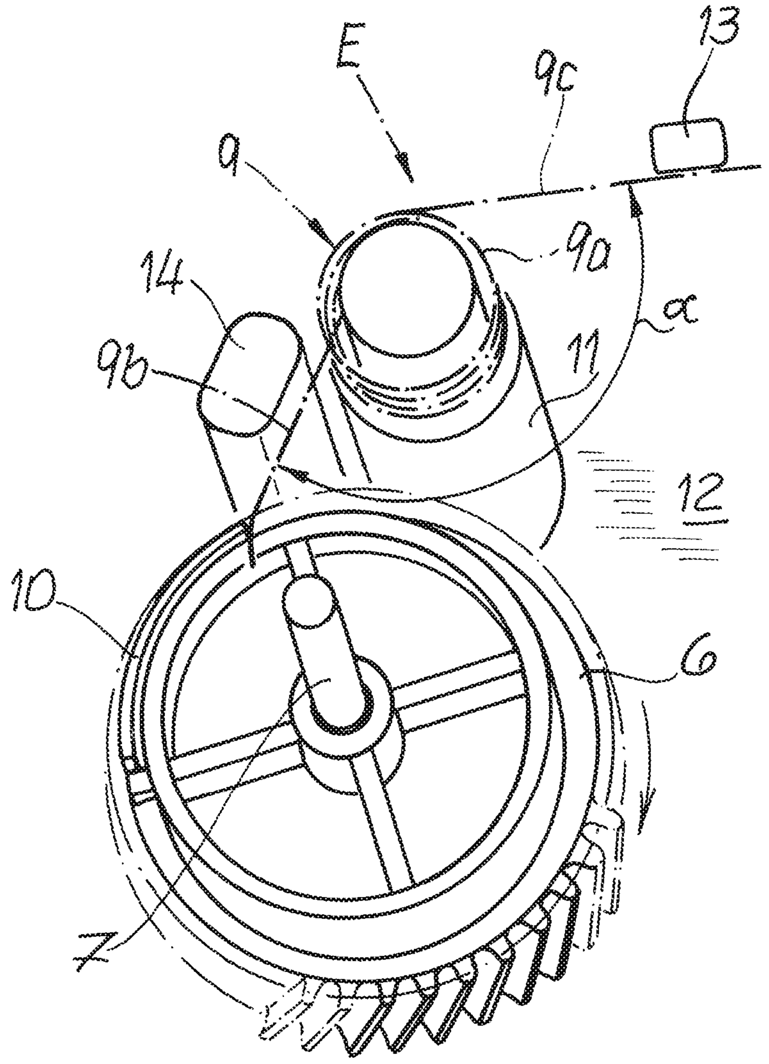
FIGS. 3 and 4 show the electromotive drive during the return movement.

During this opening process, the drive leg 9*b* of the spring or leg spring 9 rests against the contour 10 of the drive disk 6 and spreads increasingly in relation to the stationary fixed leg 9*c* during the opening process. This is possible because the spring 9 is under tension in the initial position G or neutral position shown in FIG. 1. The tension of the spring 9 is reflected by the relatively small angle $\alpha$ between the drive leg 9*b* and the fixed leg 9*c*, which according to the exemplary embodiment is approximately 40 to 50°. During the course of the opening process during the transition from FIG. 1 to FIG. 2, the drive leg 9*b* then spreads relative to the fixed leg 9*c* until the end position E of the drive disk 6 shown in FIGS. 2 and 3 is approximately present and is observed. The two legs 9*b*, 9*c* then form an angle $\alpha$ of approximately 110° to 120°. Since the spring or leg spring 9 is relaxed in this case, the spring energy or tension energy released in this way can be used to aid the movement of the drive disk 6 and thus of the entire drive.

As soon as the drive leg 9*b* has spread away from the fixed leg 9*c* and the drive disk 6 has reached its end position E shown in FIGS. 2 and 3, the drive leg 9*b* moves against a further stop 14. Like the stop 13 and the pin 11, this is generally integrally connected to the lock housing 12. Correspondingly, the stop 14 is made of plastic.

Figure 4:
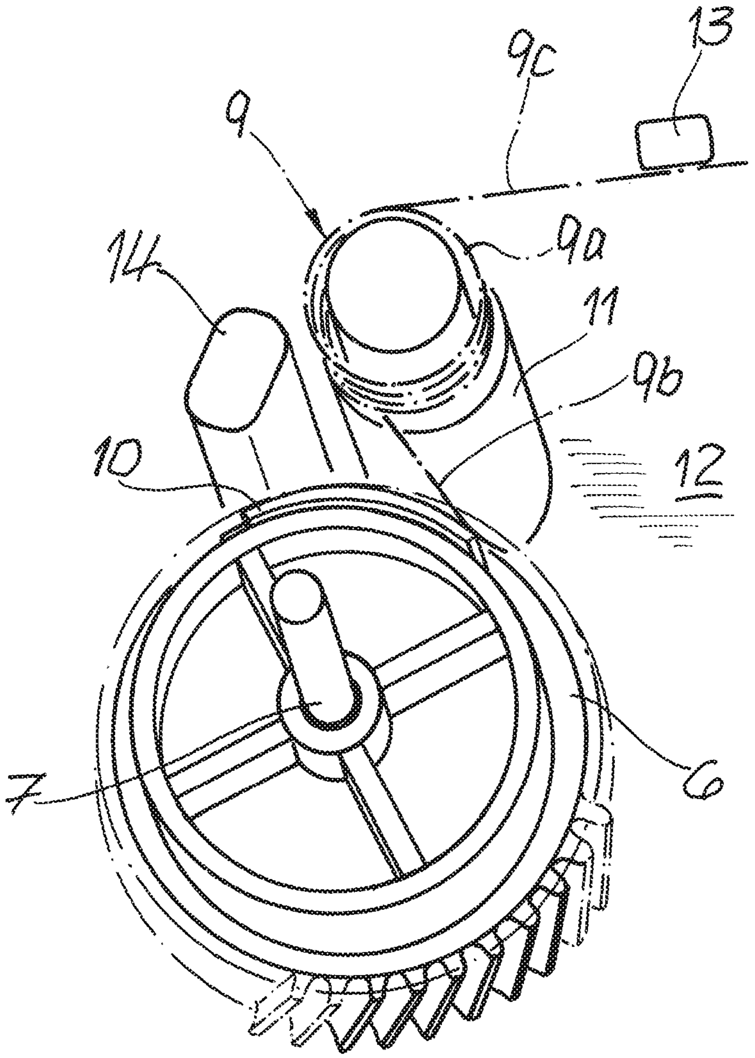

Starting from the end position E according to FIG. 3, during a return in the transition from FIG. 3 to FIG. 4, the drive disk 6 then performs a clockwise movement during the transition from FIG. 3 to FIG. 4 in the opposite direction to the opening movement in the counterclockwise direction in the view of the underside of FIGS. 1 and 2. In this process, the spring 9 or leg spring is increasingly tensioned, because the drive leg 9*b* is increasingly moved toward the fixed leg 9*c* abutting the contour 10, and thus the spring 9 acquires the required tension energy.

Figure 5:
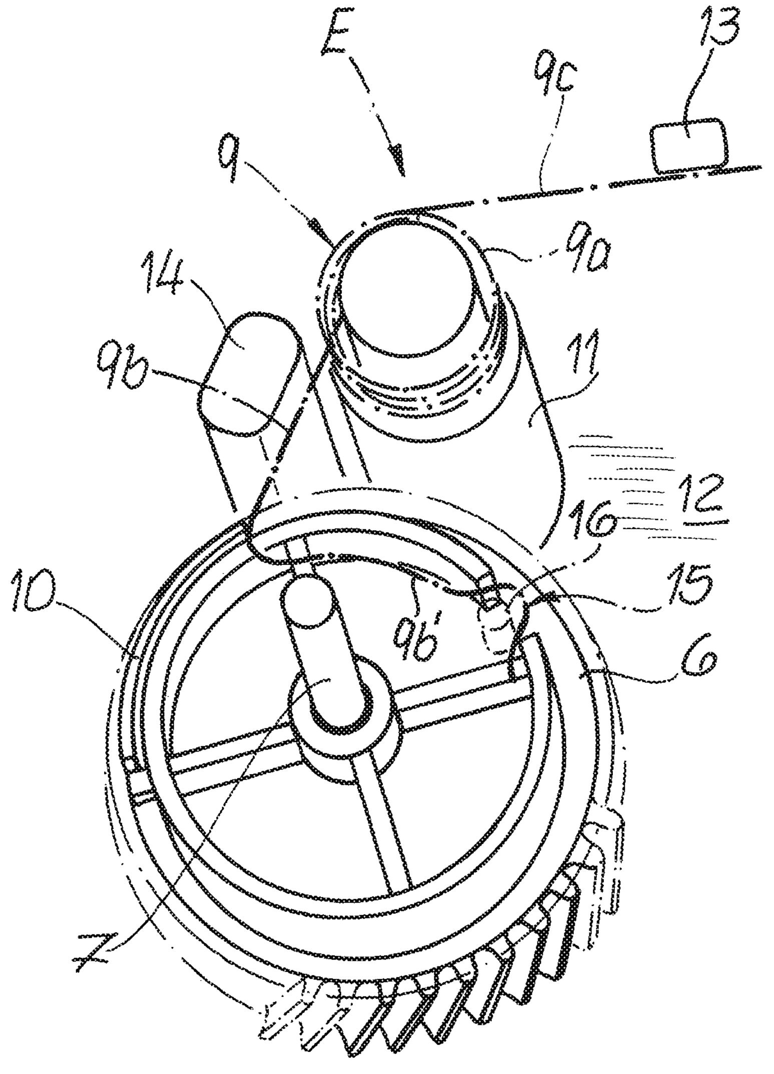
FIG. 5 shows a modified embodiment of the drive according to FIGS. 1 to 4, FIGS. 6 and 7 show a further third embodiment.

On the basis of the figures, it can be seen overall that the drive disk 6 is circular in form, with the axis 7 as a center point. In addition, the contour 10 interacting with the spring 9 is concentric in comparison thereto, and is of arcuate design. That is to say, the arc defining the contour 10 uses the axis 7 as a center point for its radial extension. FIG. shows a variant in which the drive leg 9*b* is equipped with an extension arm 9*b*'. The extension arm 9*b*' has a latching contour 15 which is designed as a convexity or recess in the extension arm 9*b*' in question. In addition, a cam 16 is provided and realized on the underside of the drive disk 6, which engages in the latching contour 15 as soon as the drive disk 6 assumes a corresponding position. According to the exemplary embodiment, the interaction between the latching contour 15 and the cam 16 occurs as soon as the drive disk 6 has assumed its end position E shown in FIG. 5. The drive leg 9*b* then also rests against the stop 14. In principle, the described interaction between the latching contour 15 and the cam 16 can also be present and can be realized in any other position of the drive disk 6.

Figure 6:
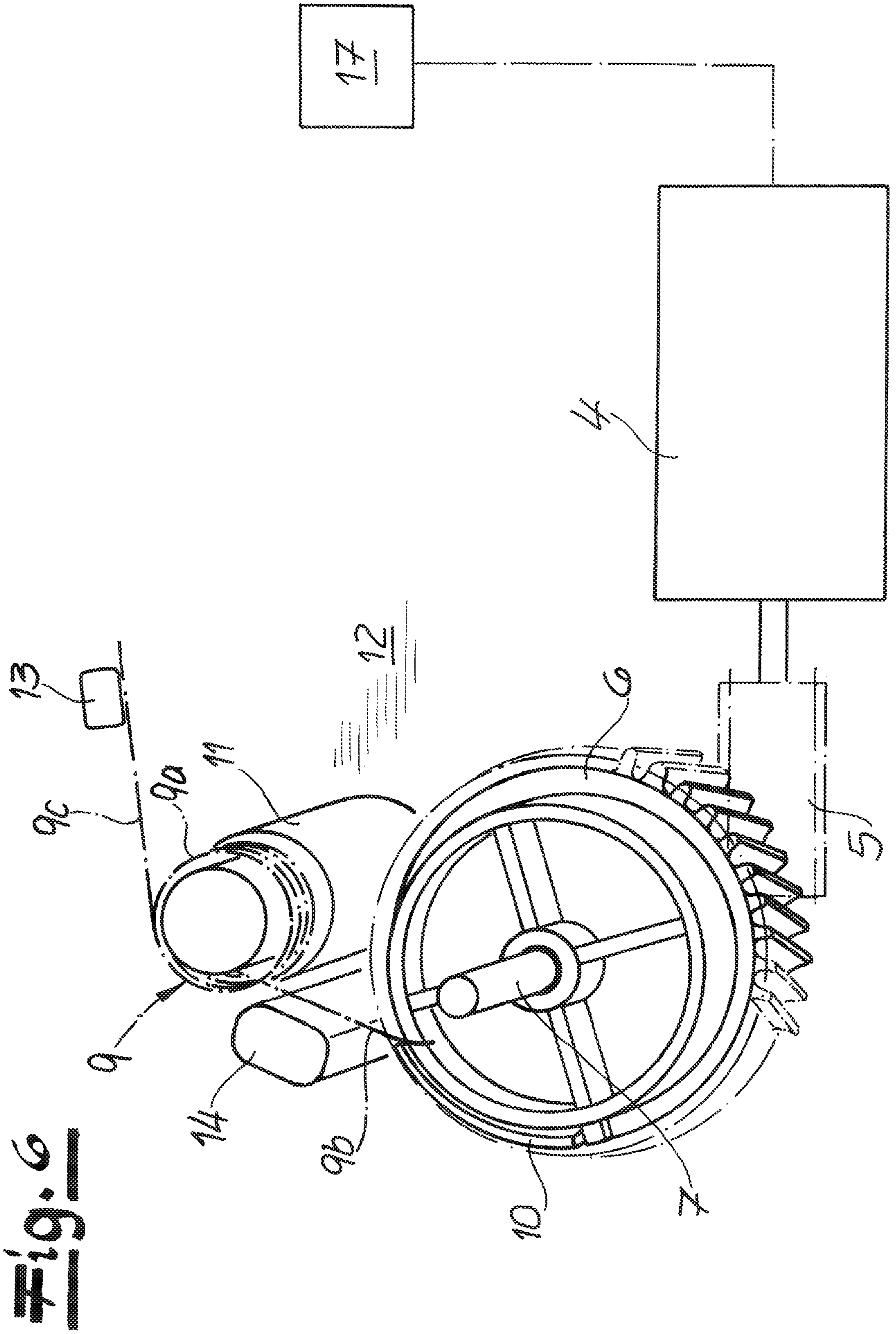
Figure 7:
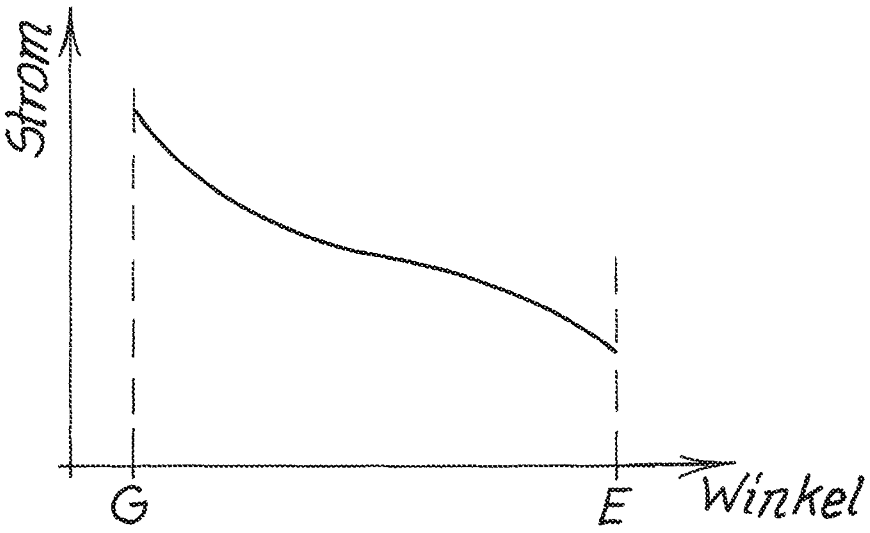

Finally, in the further and third exemplary embodiment according to FIGS. 6 and 7, a control unit 17 is provided, by means of which the electric motor 4 and thus the entire electromotive drive are actuated and supplied with energy. The control unit 17 can then detect an electrical current applied to the electric motor 4. For this purpose, the current consumption at the electric motor 4 can be measured directly or can be detected by means of a sensor (not shown). This electrical current consumed by the electric motor 4 and applied thereto is then dependent on the force built up by the spring 9.

A corresponding and schematic dependence is shown in FIG. 7. Here, the current consumed by the electric motor 4 is shown in relation to the path traveled by the drive disk 6, which is manifested in an associated pivot angle of the drive disk 6 about its axis 7. The pivot angle and/or angle in question is shown and reproduced between the initial position G and the end position E of the drive disk 6. It can be seen that the current consumed by the electric motor 4 increases in the direction toward the initial position or base position G, because the spring 9 is tensioned in the direction of the initial position G. In contrast, the current consumption in the direction of the end position E decreases, because in this direction the spring 9 aids the movement of the drive disk 6 and thus of the entire electromotive drive.

On the basis of the positional dependence of the current consumed by the electric motor 4, as is very generally represented in FIG. 7, there is the possibility for the control unit 17 to control the position of the drive disk 6 in a precise manner as a function of the current consumed by the electric motor 4. This means that, if the dependence between the current consumed by the electric motor 4 on the one hand and the angular position of the drive disk 6 on the other hand between the initial position G and the end position E is stored in the control unit 17, schematically shown in FIG. 7, for example by a calibration process, any value for the current consumption of the electric motor 4 can be identified with a corresponding angular position of the drive disk 6 between the initial position G and the end position E. As a result, the drive disk 6 can be moved into practically any desired angular position between the initial position G and the end position E, namely by detecting the current consumed by the electric motor 4 via the control unit 17, and stopping the supply of energy to the electric motor 4 when the desired angular position is reached.

In this process, it is of course possible to additionally take into account any lag of the electromotive drive due to mass inertia. This lag may correspond to a supplementary travel path or an additionally traversed angle of the drive disk 6 during its rotational movement about the axis 7, and can be taken into account by the control unit 17 in such a way that the electric motor 4 is stopped before the desired angular position is reached—namely reduced by an angular amount corresponding to the lag. If, for example, an angular position of 20° of the drive disk 6 is to be reached, with a lag of 5°, the control unit 17 ensures that the electric motor 4 is switched off when the angular position 15° is reached. In any case, the electromotive drive and/or its rotatable drive disk 6 can thereby be moved into the given, desired position. This is essential for the actuation of different functional positions within the motor vehicle lock in the example—for example, in order to be able to achieve and implement functional positions such as "theft-proof", "child-proof" or "locked" by means of the electromotive drive.

LIST OF REFERENCE SIGNS

1, 2 Locking mechanism
3 Release lever
4 Electric motor
5 Output worm
6 Drive disk
7 Axis
8 Actuating contour
9 Spring or leg spring
9*a* Wound section
9*b* Drive leg
9' Extension arm
10 Contour
11 Pin
12 Lock housing
13 Stop
14 Stop
15 Latching contour
16 Cam
17 Control unit

The invention claimed is:

1. An electromotive drive for motor vehicle applications, the electromotive drive comprising:

an electric motor, a drive disk which is actuated by the electric motor and is rotated about an axis, at least one spring functionally assigned to the drive disk, wherein the spring transmits a force to the drive disk which aids the electromotive drive, and wherein the spring is a leg spring which is fixed in place via a wound portion of the leg spring to a pin, and wherein the leg spring engages via a drive leg of the leg spring a contour on the drive disk, a first stop, wherein a fixed leg of the leg spring rests against the first stop, and a second stop, wherein the second stop is positioned for engagement by the drive leg of the leg spring when the drive disk reaches an end position, wherein the pin extends along a second axis that is different from the axis of the drive disk.

2. The electromotive drive according to claim 1, wherein the leg spring is pretensioned in an initial position such that the drive leg, in contact with the contour, spreads out increasingly relative to the fixed leg toward an extended position in order to aid the drive during operation of the drive.

3. The electromotive drive according to claim 1, wherein the drive disk is circular, with the axis as a center point, and the contour extends concentrically relative to the axis and in an arcuate shape.

4. The electromotive drive according to claim 1, wherein the drive leg is equipped with an extension arm which interacts with a cam on the drive disk for positioning of the drive disk.

5. The electromotive drive according to claim 4, wherein the extension arm has a latching contour that engages around the cam.

6. The electromotive drive according to claim 5, wherein the cam engages in the latching contour as soon as the drive disk assumes a predetermined position.

7. The electromotive drive according to claim 1, wherein an electrical current applied to the electric motor is detected as a function of a force built up by the spring.

8. The electromotive drive according to claim 7, further comprising a control unit, wherein the control unit controls a position of the drive disk as a function of the current consumed by the electric motor.

9. The electromotive drive according to claim 8, wherein the control unit further controls a position of the drive disk as a function of the force built up by the spring.

10. The electromotive drive according to claim 6, wherein the predetermined position is an end position of the drive disk.

11. The electromotive drive according to claim 4, wherein the contour and the cam are positioned on an underside of the drive disk opposite from an upper side of the drive disk that includes an actuating contour.

12. The electromotive drive according to claim 1, wherein the electric motor includes an output shaft with an output worm that interacts with toothing of a drive worm on the drive disk.

13. The electromotive drive according to claim 2, wherein in the extended position the drive leg of the leg spring rests against the second stop.

14. A motor vehicle lock comprising:

a pawl and a catch, and the electromotive drive according to claim 1, wherein the electromotive drive is an electromotive opening drive and during an opening process of the motor vehicle lock, the drive disk with assistance of the leg spring operates the pawl to lift the pawl from a latching engagement with the catch.

15. The motor vehicle lock according to claim 14, wherein in a closed position of the motor vehicle lock, the leg spring is pretensioned in an initial position against the drive disk to yield stored energy to the drive disk by spreading out toward an extended position during the opening process.

16. The motor vehicle lock according to claim 1, wherein the leg spring is pretensioned in an initial position of the drive disk, wherein the leg spring has a first angle between the drive leg and the fixed leg in the initial position and a second angle between the drive leg and the fixed leg in the end position, wherein the first angle is smaller than the second angle.

17. The motor vehicle lock according to claim 1, further comprising a lock housing, wherein the first stop and the second stop are integrally connected to the lock housing.

* * * * *